United States Patent
Pingili et al.

(10) Patent No.: US 12,210,379 B2
(45) Date of Patent: Jan. 28, 2025

(54) APPLICATION PERFORMANCE MITIGATION FOR WEARABLE DEVICE

(71) Applicant: Microsoft Technology Licensing, LLC, Redmond, WA (US)

(72) Inventors: Sudeesh Reddy Pingili, Sammamish, WA (US); Ashraf Ayman Michail, Kirkland, WA (US); Jerome Raymond Halmans, Monroe, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 112 days.

(21) Appl. No.: 17/313,045

(22) Filed: May 6, 2021

(65) Prior Publication Data

US 2022/0357779 A1 Nov. 10, 2022

(51) Int. Cl.
  *G06F 1/16* (2006.01)
  *G06T 1/20* (2006.01)
  *G06T 19/00* (2011.01)

(52) U.S. Cl.
  CPC .............. *G06F 1/163* (2013.01); *G06T 1/20* (2013.01); *G06T 19/006* (2013.01)

(58) Field of Classification Search
  CPC .......... G06F 1/163; G06T 1/20; G06T 19/006
  See application file for complete search history.

(56) References Cited

U.S. PATENT DOCUMENTS

| | | | |
|---|---|---|---|
| 2011/0072292 A1 | 3/2011 | Khawand et al. | |
| 2013/0120630 A1 | 5/2013 | Kim et al. | |
| 2014/0240031 A1 | 8/2014 | Vadakkanmaruveedu et al. | |
| 2016/0378150 A1* | 12/2016 | Sega | G06F 11/3017 700/299 |
| 2017/0123487 A1* | 5/2017 | Hazra | G06F 3/04845 |
| 2018/0067768 A1* | 3/2018 | Bhalla | G06F 9/4893 |
| 2018/0329465 A1* | 11/2018 | Tavakoli | G06F 1/3218 |
| 2020/0142458 A1 | 5/2020 | Ashwood et al. | |
| 2021/0210804 A1* | 7/2021 | Wedig | H02J 7/0068 |
| 2021/0343404 A1* | 11/2021 | Hunt | G16H 10/60 |
| 2022/0342514 A1* | 10/2022 | Chao | G06F 3/0482 |
| 2022/0357779 A1* | 11/2022 | Pingili | G06F 1/203 |

OTHER PUBLICATIONS

"International Search Report and Written Opinion Issued in PCT Application No. PCT/US22/024141", Mailed Date: Jul. 19, 2022, 12 Pages.

* cited by examiner

*Primary Examiner* — Sing-Wai Wu
*Assistant Examiner* — Khoa Vu
(74) *Attorney, Agent, or Firm* — Schwegman Lundberg & Woessner, P.A.

(57) ABSTRACT

A wearable device includes multiple subsystems including a processor and a memory device, multiple temperature sensors coupled to sense temperatures of the multiple subsystems, and programming, including an application, stored on the memory device for execution by the processor to perform operations. The operations include receiving temperature information from the multiple temperature sensors corresponding to temperatures associated with the multiple subsystems, processing the temperature information to identify a first subsystem of the multiple subsystems, and providing a notification to the application executing on the processor to mitigate application performance in a manner to reduce heat generated by the first subsystem.

20 Claims, 4 Drawing Sheets

| 510<br>MITIGATION ID | 515<br>MITIGATION LEVEL | 520<br>SUBSYSTEM(S) |
|---|---|---|
| 001 | M1 | S1 |
| 002 | M2 | S1 |
| 003 | M1 | S2 |
| 004 | M1 | S1 + S2 |
| 005 | M2 | S1 + S2 |
| 006 | M1 | S1 + S2 + S3 |
| 007 | M2 | S1 + S2 + S3 |
| 008 | M3 | S1 + S2 + S3 |
|  | M1 | .6X51 + .4 × 52 |

APPLICATION PERFORMANCE MITIGATION FOR WEARABLE DEVICE

BACKGROUND

Wearable products are continuing to grow their market share across many segments. Mixed reality wearable devices with open platforms enable developers to create unique experiences with new functions. It becomes difficult to ensure that the wearable devices do not produce heat that may be uncomfortable, or even dangerous to a wearer. Making wearable devices larger to dissipate heat can make the devices both unsightly and uncomfortable. The compute power to deliver these experiences is enormous while the push to make the device lighter and smaller for comfort is equally important. These two factors play against each other in this segment of products.

The ability to deliver compute power for high functionality and enhanced user experience is directly proportional to how much power is needed to be spent in the wearable device while the size and weight of the wearable device is directly proportional to how much heat (generated from power consumption) can be dissipated from the wearable device to keep it cool enough to be worn.

SUMMARY

A wearable device includes multiple subsystems including a processor and a memory device, multiple temperature sensors coupled to sense temperatures of the multiple subsystems, and programming, including an application, stored on the memory device for execution by the processor to perform operations. The operations include receiving temperature information from the multiple temperature sensors corresponding to temperatures associated with the multiple subsystems, processing the temperature information to identify a first subsystem of the multiple subsystems, and providing a notification to the application executing on the processor to mitigate application performance in a manner to reduce heat generated by the first subsystem.

DETAILED DESCRIPTION

Figure 1:
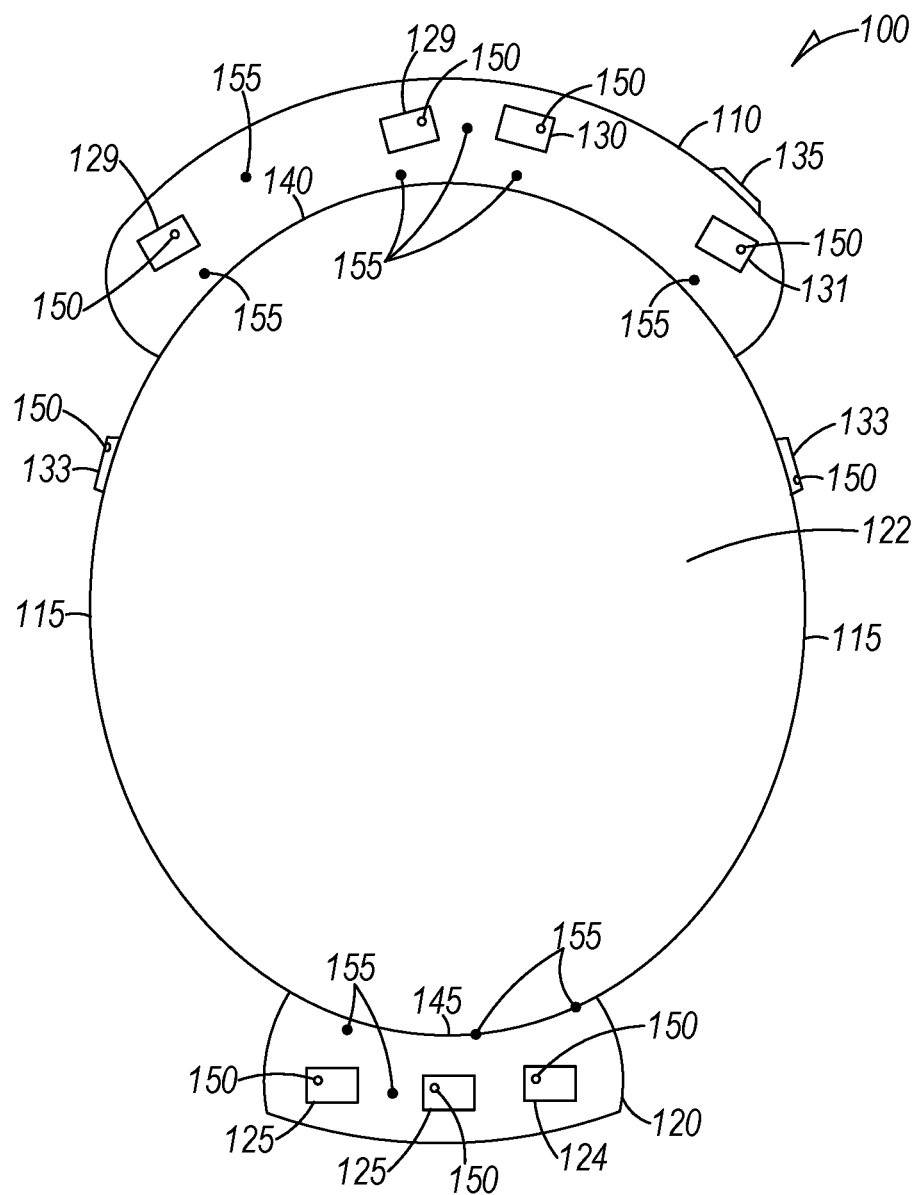
FIG. 1 is a block diagram representation of a device that provides applications the ability to control subsystem heat generation while maintaining desired user experience according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any, functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Wearable devices, such as augmented reality headsets provide platforms for applications that provide augmented reality experiences. The platforms generally include computing resources, referred to as subsystems as well as an operating system and other software on which the applications run. Various subsystems may include one or more of central processing units (CPUs), graphic processing units (GPUs), video processing chips, display circuitry, dynamic random access memory (DRAM) and other subsystems, each of which generate heat based on the amount of functions they perform.

The ability to deliver a viable experience to a user wearer is directly proportional to how much power is needed to be spent in the device while the size and weight of the device is directly proportional to how much heat (generated from power consumption) can be dissipated from the device to keep it cool enough to be worn.

Since the push is to make these devices smaller and lighter for comfort reasons, the ability to dissipate power and enable delightful experiences is always a challenge and hence these devices always tend to get warm over usage time based on the experiences running and the ambient environments they are running in.

As the device starts to warm up, the device needs to contend with how to enable the applications and platform to continue to deliver experiences while maintaining thermal comfort/safety limits for user wearers and hardware components.

Prior systems provided the capability to adjust performance of different hardware components (CPU frequencies, GPU Frequencies etc . . . ) as the system warms up. Such brute force hardware degradation can result in an inferior wearer experience. For wearable devices such as mixed and virtual reality devices, acceptable frame rates, creation of pose information, and performance of other functions should be maintained for the experience to be viable. Simply adjusting individual subsystem performance is not the right answer.

FIG. 1 is a block diagram representation of a device 100 that provides applications the ability to control subsystem heat generation while maintaining desired user experience. Device 100 provides notifications via application programming interfaces (APIs) into platform and application layers. The notifications are correlated to the subsystem or subsystems that are causing the device to warm up on a progressive scale. The notifications allow the platform, application, or both to take necessary application performance mitigations to reduce the amount of power needed to maintain acceptable device wearer experiences and therefore reduce adverse heat that the wearer experiences.

The notifications may be associated with mechanisms for adjusting application performance, referred to as knobs. Information regarding how to adjust application performance by may be provided via documentation and can basically result in the processing resources of the device to reduce heat generation by doing less complex work as described in further detail below.

Device 100 is a head mounted display device for use with augmented or virtual reality applications to deliver an experience to a user wearer of the device. Other types of wearable devices or devices that a user comes in thermally conductive contact with may also benefit from the inventive subject matter described herein.

Device 100 includes a visor 110 that includes a display 112. A headband coupled to the visor 110 includes arms 115 and a rear portion 120 that may be used to support the visor 110 in position on the head of a user wearer 122 such that the display 112 is visible to the user wearer. Various subsystems indicated at 125, 126, 127, 128, 129, 130, 131, 132 and 133 may be distributed about the device 100. Subsystems may include processors, memory, display circuitry, and other processing resources of device 100 that generate heat, forming one or more heat islands. A heat island may be formed by a single subsystem, or a combination of subsystems.

Some subsystems may be supported within or on the visor 110, with others supported within or on the rear portion 120. A longer touch surface 140 is shown as part of visor 110. Longer touch surface 140 contacts the user wearer, such as on the user wearer's forehead over a much longer and larger surface area. Another longer touch surface 145 associated with the rear portion 120 touches the back of the user wearer's head.

Various temperature sensors 150, 155 indicated by dots may be dispersed throughout the device 100 to measure temperatures of subsystems and other parts of the device 100. For example, many of the subsystems include one or more integrated temperature sensors 150. Temperature sensors 155 may be placed near touch surfaces, between subsystems, or at other desired locations supported by the device 100.

Touch surface 135 may be available for the wearer to physically touch the device 100 to control the device. The touch surface 135 may be a small area that is occasionally touched by the user or may be used quite often. An acceptable temperature of the touch surface 135 may depend on the frequency or length of time the user wearer is in contact with the touch surface 135. This length of time may be dependent on the type of application and whether or not the user experience provided by the application requires frequent or constant user contact with the touch surface 135.

Longer touch surfaces 140 and 145 in the case of a head mounted display device 110 are always in contact with the user wearer during use. Acceptable temperatures for such surfaces may be not be dependent on the type of application as wearer comfort and safety are much more significant factors in determining the acceptable temperature of longer contact touch surfaces.

Figure 2:
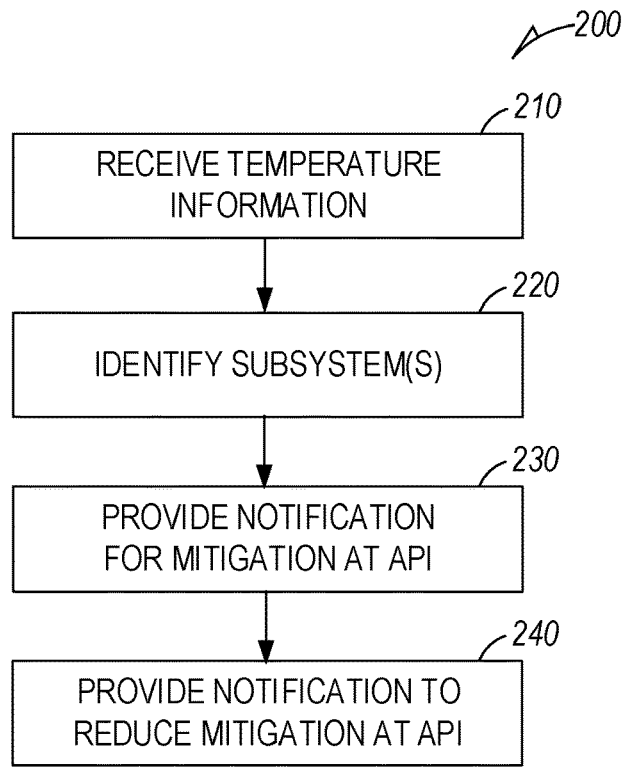
FIG. 2 is a flowchart of a computer implemented method of providing notifications to applications via an API for application performance mitigations to control temperatures experienced by wearers of wearable devices according to an example embodiment.

FIG. 2 is a flowchart of a computer implemented method 200 of providing notifications to applications via an API for application performance mitigations to control temperatures experienced by wearers of wearable devices such as device 100. Method 200 may be implemented by one or more of the subsystems, such as a CPU that receives temperature information from the various temperature sensors 150, 155. The CPU may execute programming, including one or more applications stored on a memory subsystem of device 100 to perform operations.

The operations of method 200 include receiving subsystem temperature information at operation 210 from the multiple temperature sensors corresponding to temperatures associated with the multiple subsystems. The temperature information is processed at operation 220 to identify a first subsystem of the multiple subsystems. Example subsystems include but are not limited to a CPU, memory, WiFi circuitry, camera, GPU, and display controller.

Operation 230 includes providing a notification to the application executing on the processor to mitigate application performance in a manner to reduce heat generated by the first subsystem without adversely or unacceptably affecting a user experience. The application performance degradation is under the control of the application and may be selected to ensure that the user experience is degraded in the least noticeable or least objectionable manner.

The notification may take many different forms. The notification may include information identifying the level or amount of mitigation that is advised. The information included may also identify the subsystem or subsystems that need to reduce their heat generation, allowing the application to decide what mitigations to take in order to accomplish such heat generation reduction. In some embodiments, specific recommended mitigations may be associated with the notification, such reducing a display scan rate, permitting a higher image frame miss rate by video processing circuitry, using a less accurate video processing algorithm that generates less heat, providing less complex rendering, reducing the amount of data sent via a WiFi subsystem, or any other function performed by one or more subsystems that can be simplified to reduce heat generation while maintaining a desired user wearer experience.

Processing the temperature information may include normalizing the temperature information from each temperatures sensor to facilitate consistent processing of temperature information.

The notification may be provided in response to a comparison of the temperature information with a first subsystem threshold. The comparison of the temperature information with a first subsystem threshold includes combining temperature information associated with multiple temperature sensors. This may be done by several different methods, including taking an average of temperature readings from the multiple subsystems where the subsystems all contribute to heating a portion of the device 100 that may cause undesirable heat transfer to the user wearer.

The first subsystem threshold represents a threshold determined to ensure heat generated by at least one subsystem will not cause a temperature of the device to exceed a safety temperature threshold. When such a threshold is exceeded, device safety systems will shut down the device.

The mitigation causes modification of a function of the application such that fewer heat generating computing resources are used. Examples mitigations include reducing a scan rate of a display device via the application where the display device is causing an undesired temperature increase. The notification may be in the form of information representing a severity of performance mitigation needed to reduce the potential for undesired temperatures. The notification may be a percentage that indicates a percentage of a maximum performance acceptable for the first subsystem. For example, a 90% notification may indicate that performance of the first subsystem should be reduced to 90% of a maximum performance level. The notification may even specify a level of mitigation desired, such as none, minor, medium, high, or even a binary indication to apply mitigation or not to apply mitigation. The mitigation levels may be specific for each subsystem or combination of subsystems.

Method 200 may also provide a further notification at operation 240 to reduce mitigation in response to the temperature information being indicative of a reduced need for temperature control of one or more specified subsystems.

Figure 3:
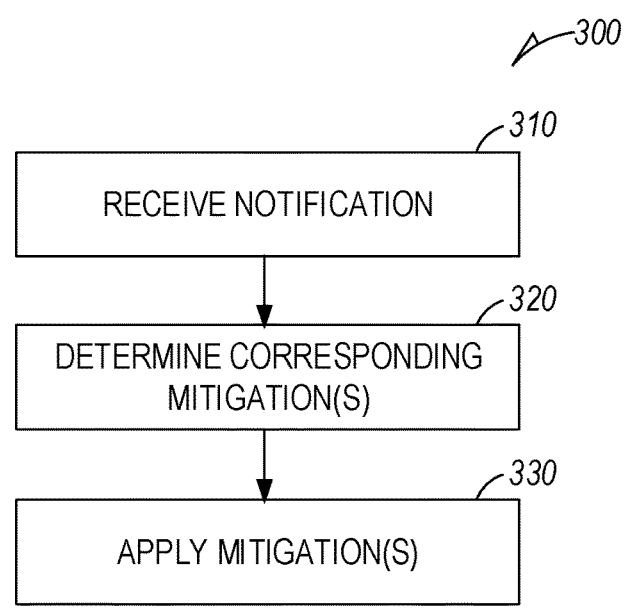
FIG. 3 is a flowchart of a computer implemented method of an application utilizing notifications to perform application performance mitigations according to an example embodiment.

FIG. 3 is a flowchart of a computer implemented method 300 of an application utilizing notifications to perform mitigations. At operation 310, a notification is received via the API. The notification may be a notification ID in one example that can be used by the application to determine corresponding mitigations as operation 320. The application may include a table of mitigations that have been pre-programmed into the application for each different notification ID. In further examples, the notification may actually identify one or more subsystems and a severity of the mitigation needed for those subsystems. The application may have a list of mitigations for each subsystem and is then able to apply the mitigation or mitigations at operation 330 to ensure those subsystems consume less power by modifying functions performed by the subsystems.

Figures 4, 5:
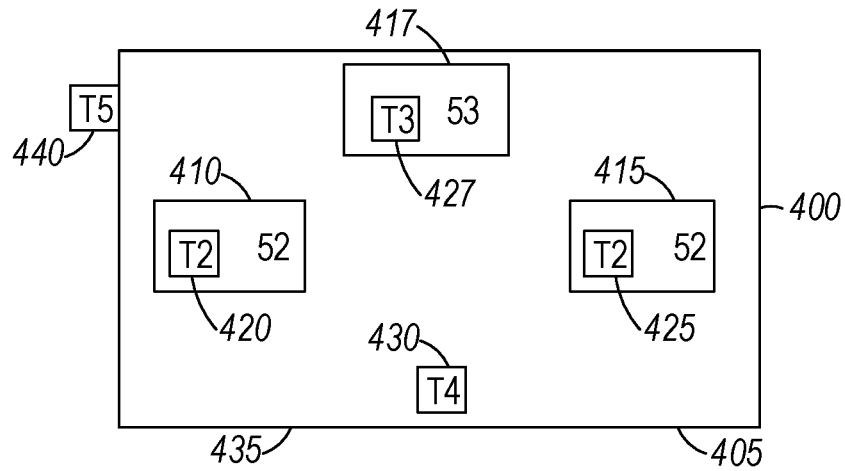
FIG. 4 is a block diagram of a wearable device having a touch surface that comes into a contact with a wearer of the wearable device according to an example embodiment.
FIG. 5 is a table illustrating information associated with various application performance mitigation notifications according to an example embodiment.

FIG. 4 is a block diagram of a wearable device 400. Wearable device 400 has a touch surface 405 that comes into a contact with a wearer of the wearable device 400. Wearable device 400 may be a headset device, a physiological parameter monitor, a cellular phone, or any other electronic device that may come into contact with a wearer, either via intermittently touched control surfaces, or prolonged contact via attachment to a wearer along touch surface 405.

Device 400 is shown as containing three subsystems S1 at 410, S2 at 415, and S3 at 417. The subsystems have corresponding temperature sensors T1 420, T2 425, and T3 427. A fourth temperature sensor T4 at 430 is shown thermally coupled and proximate to touch surface 405 for providing a temperature reading corresponding to a temperature experienced by the wearer at touch surface 405.

In one example, as the temperature of S1 410 increases as measured via T1 420, it may reach a threshold temperature value to trigger a mitigation notification. The notification will correspond to subsystem S1, indicating that the application should apply a mitigation to reduce the amount of application utilization of subsystem S1 such that less heat is generated by S1. The threshold temperature of S1 may be determined by empirical data through testing, observing that as the temperature of S1 increases, the generated heat will be thermally conducted to surface 405 to reach an undesired temperature of at least a portion 435 of surface 405 that is most closely thermally conductively coupled to S1.

As shown in FIG. 4, S1 is physically closest to the touch surface 405 at portion 435. Given uniform thermal conductively of device 400, the physically closest point will likely be the point to receive the most heat from S1. However, uniform thermal conductivity is unlikely to be present.

Temperature sensor T4 430 is shown somewhat centered along touch surface 405 and may also be used to trigger a notification Heat from S1 and S2, shown equal distant from T4 may both contribute heat to the touch surface proximate T4. As such, a temperature threshold corresponding to sensed temperature by T4 may trigger a notification that a mitigation should be applied to both S1 and S2. As temperature detected at T4 increases, further severity, thresholds may indicate that higher levels of mitigation should occur, including mitigations that affect the heat generated by S3 417 which is shown further from 14 in a further embodiment, an ambient environment temperature T5 at 440 may be received by the device to help predict rate of change of temperature of a touch surface. While T5 is shown supported by the device 400, T5 should be thermally decoupled from the device to better reflect temperature of the environment to which device 400 radiates excess heat.

S2 and S3 may also have temperature thresholds that trigger mitigations directed at reducing heat generated by the respective subsystems. These triggers may be separate from the triggers caused by increasing temperature detected by T4, or in some embodiments may be tied together via algorithms designed to generate a combined mitigation recommendation, such as reducing heat generated by all three or selected pairs, or even one of the three subsystems. Percentages or levels of mitigation for each of the subsystems may be different, such as a mitigation that indicates S1 should perform at 90%, S2 at 70%, and S3 at 100%.

Note that triggering of notification may be caused by discrete temperature values of thresholds or may be somewhat predictive in nature by calculating a time at which a selected temperature of the touch surface 405 may be reached noting the rate of temperature increase or decrease combined with known times for thermal conductivity to transfer heat from the subsystems to one or more portions of the touch surface 405.

In one example, S1 may be a CPU and S2 may be a GPU. The CPU/GPU subsystem computations are causing the device 400 to consume too much power and overheat the device. The device 400 receives temperature information allowing tracing of the overheating cause back to the CPU/GPU subsystem based either on the area of the device that is overheating at T4 or by processing temperature information from T1 and T2.

The notification is provided to the application to deploy a minimum mitigation or set of mitigations for one or more of subsystems. The mitigations may be left up to the application and may include a single mitigation, such as using less resource intensive algorithms for performing one or more functions. If the device continues to overheat then the API informs the application/platform to start deploying a medium set of mitigations. If the device still continues to overheat then the API informs the application/platform for a maximum set of mitigations. Hat any time the mitigations are successful, or the device moves into a different ambient condition causing the product to start to cool down then the API will start informing the applications to start reverting the mitigations in reverse order.

There are existing mechanisms that scale the raw performance of a subsystem (for example: CPU or GPU or DRAM frequencies to enable a product to have more or less computing resources available) as the system warms and cools, but on Mixed Reality Devices, adjusting the raw performance of subsystem without the application/platform understanding how this is affecting the visual experience they are attempting to create leads to bad results. In the case of adjusting CPU/GPU/DRAM frequencies to lower power results in dropped frame rates from the applications, causing the user to feel an uncontrolled degradation in experience.

However, informing the Application/Platform layers as to which subsystem is leading to the device overheating in a controlled manner and providing detailed documentation about what can be adjusted to lower power in a phased manner lends to a controlled degradation from the application while maintaining user experience. This also enables the application to inform the wearer, such as via a dialog, about the changes in experience that are occurring based on the device overheating, Information regarding the mitigation may be provided to the user via a display or speaker. Such information may even allow the wearer to make adjustments by moving to a shady location, pausing game play, or even selecting different resolutions or otherwise modifying their experience through user adjustable system or application parameters.

In another example, if the CPU/GPU/DRAM subsystems are overheating, the notice can provide detailed instruction about what work should be modified to reduce heat generation by consuming less power.

Further example performance mitigations include reducing the amount of physics calculations to determine content to be rendered and rendering content with less complexity to show the intended objects but at less fidelity.

If an application is making use of a camera and processing content, such processing functions can be performed at progressively lower resolutions, resulting in fewer calculations and less heat generation. The notifications allow the application to select the resolution in response to the severity of heat mitigation indicated in the notification.

If application is sending and receiving data via WiFi, such operations may be delayed, or the number of operations may be reduced to generate less heat. In further examples, the notification may even provide express suggestions for mitigations.

The notifications enable the application to be in charge of the user wearer experience by making tradeoffs that may result in less degradation of the experience while at the same time strategically reducing heat generation and associated undesired temperatures in selected areas of the device which may be in contact. The platform detects what subsystems are contributing heat to what device locations and bubbles this information up to the applications via the notifications.

This API also enables applications to create very complex experiences in cool ambient environments as a cooler outside environment keeps the device from overheating. Application performance and corresponding user experience may be scaled back in warmer environments as heat dissipation becomes more difficult.

FIG. 5 is a table 500 illustrating information associated with various notifications. A first column contains a mitigation ID. Eight mitigations are shown in the rows of the column, each having a different mitigation ID. A mitigation level is shown at column 515 and a corresponding subsystem or subsystems associated with the ID are shown in column 520. The API may just include the mitigation ID in one example, where the application utilizes a similar table 500 to identify the actual subsystems to mitigate and the level of mitigation to apply. In further examples, the mitigation level and subsystems may be provided in the notification itself, allowing the application to select appropriate mitigations based on the actual data. In still further examples actual temperatures of subsystems may be provided for use by the application in determining appropriate mitigations to apply.

Mitigation levels 515 are shown as simple level indicators, M1, M2, and M3. As previously described, such indicators may be percentages or simply numbers, such as a number normalized between 1 and 10, or 0 and 1. The subsystems column 520 identifies the subsystem by an ID, or description of the subsystem. One or more subsystems may be identified for each mitigation ID and in one example, individual amounts of mitigation for each subsystem may be specified, such as a relative or ratio of mitigation for each subsystem S1 at 0.6 and S2 at 0.4, meaning that S1 should be mitigated slightly more than S2.

Figure 6:
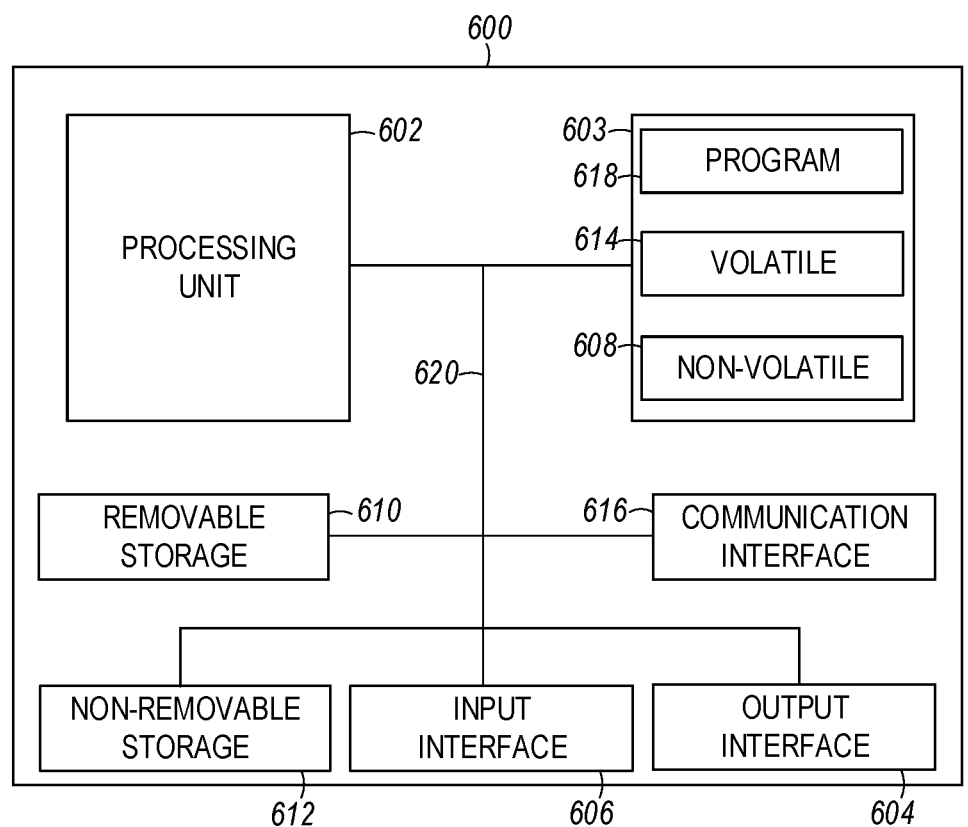
FIG. 6 is a block schematic diagram of a computer system to implement one or more example embodiments.

FIG. 6 is a block schematic diagram of a computer system 600 to implement various devices for generating subsystem heat mitigation notices to one or more executing applications and for performing methods and algorithms according to example embodiments. All components need not be used in various embodiments.

One example computing device in the form of a computer 600 may include a processing unit 602, memory 603, removable storage 610, and non-removable storage 612. Although the example computing device is illustrated and described as computer 600, the computing device may be in different forms in different embodiments. For example, the computing device may instead be a smartphone, a tablet, smartwatch, smart storage device (SSD), or other computing device including the same or similar elements as illustrated and described with regard to FIG. 6. Devices, such as smartphones, tablets, and smartwatches, are generally collectively referred to as mobile devices or user equipment.

Although the various data storage elements are illustrated as part of the computer 600, the storage may also or alternatively include cloud-based storage accessible via a network, such as the Internet or server-based storage. Note also that an SSD may include a processor on which the parser may be run, allowing transfer of parsed, filtered data through 110 channels between the SSD and main memory.

Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input interface 606, output interface 604, and a communication interface 616. Output interface 604 may include a display device, such as a screen, that also may serve as an input device. The input interface 606 may include one or more of a touchscreen, touchpad, mouse, keyboard, camera, one or more device-specific buttons, one or more sensors integrated within or coupled via wired or wireless data connections to the computer 600, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Bluetooth, or other networks. According to one embodiment, the various components of computer 600 are connected with a system bus 620.

Computer-readable instructions stored on a computer-readable medium are executable by the processing unit 602 of the computer 600, such as a program 618. The program 618 in some embodiments comprises software to implement one or more methods described herein, such as providing a platform for applications and providing an API to push notifications to the applications or allow applications to pull data corresponding to mitigation notifications. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 618 along with the workspace manager 622 may be used to cause processing unit 602 to perform one or more methods or algorithms described herein.

EXAMPLES

1. A wearable device includes multiple subsystems including a processor and a memory device, multiple temperature sensors coupled to sense temperatures of the multiple subsystems, programming, including an application, stored on the memory device for execution by the processor to perform operations. The operations include receiving temperature information from the multiple temperature sensors corresponding to temperatures associated with the multiple subsystems, processing the temperature information to identify a first subsystem of the multiple subsystems, and providing a notification to the application executing on the processor to mitigate application performance in a manner to reduce heat generated by the first subsystem.

2. The device of example 1 wherein processing the temperature information comprises normalizing the temperature information.

3. The device of any of examples 1-2 wherein the notification is provided in response to a comparison of the temperature information with a first subsystem threshold.

4. The device of example 3 wherein the comparison of the temperature information with a first subsystem threshold includes combining temperature information associated with multiple temperature sensors.

5. The device of any of examples 3-4 wherein the first subsystem threshold represents a threshold determined to ensure heat generated by at least one subsystem will not cause a temperature of the device to exceed a desired temperature at any touch surface of the device.

6. The device of any of examples 1-5 wherein the mitigation causes modification of a function of the application such that fewer heat generating computing resources are used.

7. The device of any of examples 1-6 wherein the mitigation causes modification of a scan rate of a display device via the application.

8. The device of any of examples 1-7 wherein the notification comprises a representation of a severity of performance mitigation.

9. The device of any of examples 1-8 wherein the notification comprises a percentage of performance acceptable associated with the first subsystem.

10. The device of any of examples 1-9 wherein the first subsystem comprises one or more of a CPU, memory, WiFi circuitry, camera, GPU, and display.

11. The device of any of examples 1-10 wherein the mitigation causes modification of an acceptable dropped frame level of a GPU subsystem.

12. The device of any of examples 1-11 and further comprising providing a further notification to reduce mitigation in response to the temperature information being indicative of a reduced need for temperature control.

13. A computer implemented method includes receiving temperature information from the multiple temperature sensors corresponding to temperatures associated with the multiple subsystems in a wearable device, processing the temperature information to identify a first subsystem of the multiple subsystems, and providing a notification to an application executing on the processor to mitigate application performance in a manner to reduce heat generated by the first subsystem.

14. The method of example 13 wherein the notification is provided in response to a comparison of the temperature information with a first subsystem threshold.

15. The method of example 14 wherein the comparison of the temperature information with a first subsystem threshold includes combining temperature information associated with multiple temperature sensors.

16. The method of any of examples 14-15 wherein the first subsystem threshold represents a threshold determined to ensure heat generated by at least one subsystem will not cause a temperature of the device to exceed a desired temperature at any touch surface of the device.

17. The method of any of examples 13-16 wherein the mitigation causes modification of a function of the application such that fewer heat generating computing resources are used to perform the function.

18. The method of any of examples 13-17 wherein the notification comprises a representation of a severity of performance mitigation.

19. The method of any of examples 13-18 and further comprising providing a further notification to reduce mitigation in response to the temperature information being indicative of a reduced need for temperature control.

20. A machine-readable storage device has instructions for execution by a processor of a machine to cause the processor to perform operations to perform a method. The operations include receiving temperature information from the multiple temperature sensors corresponding to temperatures associated with the multiple subsystems in a wearable device, processing the temperature information to identify a first subsystem of the multiple subsystems, and providing a notification to an application executing on the processor to mitigate application performance in a manner to reduce heat generated by the first subsystem.

21. A computer implemented method includes receiving a notification containing information identifying a need to reduce heat being generated in a hardware subsystem, determining a corresponding application performance mitigation for the hardware subsystem, and applying the application performance mitigation to the application to reduce heat generated by the subsystem.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A wearable device comprising:
multiple subsystems including a processor and a memory device;
multiple temperature sensors coupled to sense temperatures of the multiple subsystems;
programming, including an application running on an operating system, the application being stored on the memory device for execution by the processor to perform operations comprising:
receiving temperature information from the multiple temperature sensors corresponding to temperatures associated with the multiple subsystems;
processing the temperature information to identify a first subsystem of the multiple subsystems; and
providing a notification to the application executing on the processor to cause the application to perform a mitigation to mitigate its performance, while the application continues to execute, in a manner to reduce heat generated by the first subsystem.

2. The device of claim 1 wherein processing the temperature information comprises normalizing the temperature information.

3. The device of claim 1 wherein the notification is provided in response to a comparison of the temperature information with a first subsystem threshold.

4. The device of claim 3 wherein the comparison of the temperature information with a first subsystem threshold includes combining temperature information associated with multiple temperature sensors.

5. The device of claim 3 wherein the first subsystem threshold represents a threshold determined to ensure heat generated by at least one subsystem will not cause a temperature of the device to exceed a desired temperature at any touch surface of the device.

6. The device of claim 1 wherein the mitigation causes the application to modify a function of the application to use a less resource intensive algorithm such that fewer heat generating computing resources are used during execution of the application.

7. The device of claim 1 wherein the mitigation is selected by the application to result in less heat being generated by one or more subsystems thermally proximate a touch surface of the device.

8. The device of claim 1 wherein the notification comprises a representation of a severity of performance mitigation.

9. The device of claim 1 wherein the notification comprises a percentage of performance acceptable associated with the first subsystem.

10. The device of claim 1 wherein the first subsystem comprises one or more of a CPU, memory, WiFi circuitry, camera, GPU, and display.

11. The device of claim 1 wherein the mitigation is selected from a table of mitigations corresponding to multiple combinations of subsystems correlated to different touch surfaces of the device.

12. The device of claim 1 and further comprising providing a further notification to reduce mitigation in response to the temperature information being indicative of a reduced need for temperature control.

13. A computer implemented method comprising:
receiving temperature information from multiple temperature sensors corresponding to temperatures associated with multiple subsystems in a wearable device, including a processor and memory;
processing the temperature information to identify a first subsystem of the multiple subsystems; and
providing a notification to an application running on an operating system and executing on the processor to cause the application to perform a mitigation to mitigate its performance, while the application continues to execute, in a manner to reduce heat generated by the first subsystem.

14. The method of claim 13 wherein the notification is provided in response to a comparison of the temperature information with a first subsystem threshold.

15. The method of claim 14 wherein the comparison of the temperature information with a first subsystem threshold includes combining temperature information associated with multiple temperature sensors.

16. The method of claim 14 wherein the first subsystem threshold represents a threshold determined to ensure heat generated by at least one subsystem will not cause a temperature of the device to exceed a desired temperature at any touch surface of the device.

17. The method of claim 13 wherein the mitigation causes modification of a function of the application such that fewer heat generating computing resources are used during execution of the application to perform the function.

18. The method of claim 13 wherein the notification comprises a representation of a severity of performance mitigation.

19. The method of claim 13 and further comprising providing a further notification to reduce mitigation in response to the temperature information being indicative of a reduced need for temperature control.

20. A machine-readable storage device having instructions for execution by a processor of a machine to cause the processor to perform operations to perform a method, the operations comprising:

receiving temperature information from multiple temperature sensors corresponding to temperatures associated with multiple subsystems in a wearable device;

processing the temperature information to identify a first subsystem of the multiple subsystems; and providing a notification to an application running on an operating system and executing on the processor to cause the application to perform a mitigation to mitigate its performance, while the application continues to execute, in a manner to reduce heat generated by the first subsystem.

* * * * *